United States Patent
Stahl et al.

(10) Patent No.: US 10,279,534 B2
(45) Date of Patent: May 7, 2019

(54) PRODUCTION OF CURVED PREFORMS

(71) Applicant: DEUTSCHES ZENTRUM FÜR LUFT-UND RAUMFAHRT E.V., Köln (DE)

(72) Inventors: Arne Stahl, Braunschweig (DE); Henrik Borgwardt, Braunschweig (DE); Christian Hühne, Hannover (DE)

(73) Assignee: DEUTSCHES ZENTRUM FUR LUFT-UND RAUMFAHRT E.V., Cologne (DE)

( * ) Notice: Subject to any disclaimer, the term of this patent is extended or adjusted under 35 U.S.C. 154(b) by 218 days.

(21) Appl. No.: 15/121,245

(22) PCT Filed: Feb. 26, 2015

(86) PCT No.: PCT/EP2015/054049
§ 371 (c)(1),
(2) Date: Aug. 24, 2016

(87) PCT Pub. No.: WO2015/128425
PCT Pub. Date: Sep. 3, 2015

(65) Prior Publication Data
US 2016/0361862 A1    Dec. 15, 2016

(30) Foreign Application Priority Data
Feb. 28, 2014   (DE) .................... 20 2014 100 927 U

(51) Int. Cl.
*B29C 53/04*    (2006.01)
*B29B 11/16*    (2006.01)
(Continued)

(52) U.S. Cl.
CPC ............ *B29C 53/043* (2013.01); *B29B 11/16* (2013.01); *D04H 5/10* (2013.01); *B29L 2031/00* (2013.01);
(Continued)

(58) Field of Classification Search
CPC ......... B29B 11/16; B29C 53/043; D04H 5/10; D04H 13/00; B29L 2031/7739
See application file for complete search history.

(56) References Cited

U.S. PATENT DOCUMENTS 5,394,906 A * 3/1995 Farley .................... B29B 11/16
139/11
7,967,932 B2 * 6/2011 Umeda ................. B29C 66/524
156/180

(Continued)

FOREIGN PATENT DOCUMENTS

DE   10 2008 032 574 A1   1/2010
DE   10 2009 008 329 A1   8/2010
(Continued)

*Primary Examiner* — James P Mackey
(74) *Attorney, Agent, or Firm* — W&C IP

(57) ABSTRACT

The invention relates to a device (1) for producing a curved preform (9) from flat semi-finished fiber material (8), comprising a shearing unit (2), which has at least two rotating rolling elements (3a, 4a), arranged spaced apart in a conveying direction (11), and a control unit (6) connected to the rolling elements, wherein at least one of the rolling elements is formed in a pivotal or tilting manner and a semi-finished fiber material sensing device (7) is provided, which is formed for sensing position information of the semi-finished fiber material conveyed through the shearing unit, wherein the control unit is further arranged for pivoting or tilting the at least one rolling element during the conveyance of the semi-finished fiber material, depending on the sensed position information from the semi-finished fiber material sensing device.

13 Claims, 3 Drawing Sheets

(51) Int. Cl.
　　　*D04H 5/10*　　　(2012.01)
　　　*D04H 13/00*　　(2006.01)
　　　*B29L 31/00*　　(2006.01)

(52) U.S. Cl.
　　　CPC ...... *B29L 2031/7739* (2013.01); *D04H 13/00* (2013.01)

(56) References Cited

U.S. PATENT DOCUMENTS

| | | | |
|---|---|---|---|
| 8,668,796 B2* | 3/2014 | Niefnecker | B29C 70/386 156/162 |
| 9,186,842 B2* | 11/2015 | Witte | B29C 53/043 |
| 9,518,356 B2* | 12/2016 | Sundermann | D06M 15/70 |
| 9,707,726 B2* | 7/2017 | Reinhold | B29B 11/16 |
| 2014/0102627 A1* | 4/2014 | Witte | B29B 11/16 156/200 |

FOREIGN PATENT DOCUMENTS

| | | |
|---|---|---|
| DE | 10 2012 101 706 A1 | 9/2013 |
| DE | 10 2012 102 204 A1 | 9/2013 |
| EP | 1 918 089 A2 | 5/2008 |
| EP | 2 374 607 A2 | 10/2011 |
| EP | 2 633 965 A2 | 9/2013 |
| EP | 2 722 145 A1 | 4/2014 |

\* cited by examiner

PRODUCTION OF CURVED PREFORMS

The invention relates to a device and a method for producing a curved preform from flat semi-finished fiber products.

On account of the particularly advantageous property of having a very high rigidity in at least one direction with a relatively low weight, fiber composite components are suitable for a large number of applications. Here, fiber composite components of this type are also being used increasingly for load-bearing structures in the automotive and aviation sectors, for example so as to be able to save fuel as a result of the reduction of the overall weight.

Fiber composite components are generally formed from a semi-finished fiber product and a matrix material, for example a plastic. By impregnating the semi-finished fiber products with the matrix material before or during the production process, the fibers of the semi-finished fiber product are encased by the matrix material and thus form an integral component once the matrix material has cured. The load-bearing fibers of the semi-finished fiber product, which are now embedded in the cured matrix material, provide the component with its high rigidity in the fiber direction.

The component shape is generally formed by draping the semi-finished fiber products in or on what is known as a mold. The mold has a surface structure which corresponds to the component geometry of the fiber composite component to be produced, wherein the dry or pre-saturated fiber sheets are adapted to the surface. In the case of complicated structures, the semi-finished fiber products can also be brought by other methods into the desired shape, which is generally referred to as "preforming". Semi-finished fiber products which have obtained the desired component geometry either in the mold or another forming process are referred to as "preforms". A preform is therefore a semi-finished product which is formed from semi-finished fiber products and which has, at least in part, the component geometry of the fiber composite component to be produced.

An advantage of fiber composite components lies in the fact that the fibers can be oriented with the load so as to be able to transmit high loads at low weight. In the case of loads transversely to the fiber direction of the fiber composite component, these can by contrast only be withstood with difficulty, and therefore the components are generally less stable transversely to the fiber direction.

For curved profiles, such as Z- or C-profiles for example, which are primarily loaded by bending, it is thus very important that the orientation of the fibers along the profile length remains constant. With reference to the example of a profile curved in a circular manner, this means that a coordinate system forming the basis of the fiber orientation or would rotate on the component about the center point of the circle and would predefine a different orientation of the fibers at any point on the component. Due to the greater peripheral length of the outer projection or outer flange of the profile, the fiber material must be stretched in the region of the outer projection and therefore the originally right-angled fiber angle between the individual fibers must be changed.

In methods in which semi-finished fiber products previously cut to size are draped, there is the disadvantage however that the cut blanks behave differently in the edge regions than in the center of the cut blank. Varying fiber angles result in the preform as a whole. However, it cannot be ensured that the required fiber angles occur throughout the profile.

In addition, methods of this type have the disadvantage that they usually involve a high manual processing effort, which makes them uneconomical for larger quantities and cannot ensure reproducible quality. This is due to the fact that the draping process, in which the material is sheared, cannot be defined and therefore cannot be carried out with sufficiently high repetition accuracy.

By way of example, DE 10 2008 032 574 A1 discloses a device for producing fiber-reinforced components, in which a draping arrangement is provided on a main frame, with which arrangement the fiber fabric can be draped by applying a vacuum to the mold core. This type of forced deformation of the fiber fabric has the disadvantage, however, that a defined and reproducible shearing of the fibers cannot be ensured here either.

In addition, on account of friction at the mold core as the fiber fabric is draped, the fiber material may be damaged, which is severely detrimental to the stability of the subsequent component.

DE 10 2012 101 706 A1 discloses a device for producing a curved preform in which, by means of two roll bodies, which are arranged at a distance from one another in the rolling direction, semi-finished fiber products bearing against the roll bodies are sheared on account of a rotational speed difference set between the two roll bodies. Here, there is the disadvantage, however, that the shearing at the semi-finished fiber product does not occur along the predefined rolling path on account of displacements of the semi-finished fiber products in the semi-finished fiber product plane, and therefore different shear angles can be created within the fiber orientation of the sheared semi-finished fiber products. The automated shearing process therefore, in some circumstances, is not reproducible in respect of the predefined quality.

The object of the present invention is therefore to specify an improved device and an improved method for producing curved preforms, with which a defined shearing with reproducible shearing quality can be achieved in an automated manner.

The object is achieved in accordance with the invention with the device according to claim 1 and the method according to claim.

In accordance with the invention, a device is proposed which has a shearing arrangement consisting of at least two rotating roll bodies. The rotating roll bodies are arranged at a distance from one another in a conveying direction or in a rolling direction and are connected to a control arrangement, which can separately adjust the rotational speed for each roll body. A rotational speed can thus be set for each roll body which can be different from the rotational speed of the other roll body.

The roll bodies are now arranged and formed in the shearing arrangement in such a way that they bear in a frictionally engaged manner against a semi-finished fiber product introduced into the device. If a rotational speed difference is now set, with the roll bodies arranged at a distance from one another each having a different rotational speed, a shearing of the fibers of the semi-finished fiber product is produced as a result of the rotational speed difference between the roll bodies and ultimately results in a defined curvature of the semi-finished fiber product. Due to a shearing of the fibers, for example by pulling or compressing the flat semi-finished fiber product, the flat semi-finished fiber product can be provided with a defined curvature as a result of the defined shearing.

In order to increase the accuracy of the shearing by means of the roll bodies, it is also proposed in accordance with the invention for the roll bodies to be pivotable or tiltable in particular in a semi-finished fiber product plane defined by the semi-finished product bearing against the roll bodies in a frictionally engaged manner, such that the angle of engagement between the roll body and the fiber material can change. It is thus possible, with the aid of the roll bodies, to introduce a force transversely to the conveying direction into the semi-finished fiber product, whereby the conveying trajectory with respect to the roll bodies can be changed.

In accordance with the invention a semi-finished fiber product detection arrangement is also provided, which is designed to detect position information relating to the semi-finished fiber product conveyed through the shearing arrangement. With the aid of position information of this type, which in particular can relate to the arranged roll bodies, it is possible to determine the orientation with which the flat semi-finished fiber product is conveyed through the shearing arrangement. If the position in which the roll bodies bear in a frictionally engaged manner against the semi-finished fiber product changes, in particular with respect to the external dimension of the semi-finished fiber product, the resultant shearing deviates from the desired target shearing of the fibers, since the semi-finished fiber product is now conveyed through the shearing arrangement over a modified path. Due to the modified position of engagement of the roll bodies with respect to the flat semi-finished fiber product, a shearing that deviates from the target shearing results when the rotational speed difference is constant.

In accordance with the invention the control arrangement is now designed such that it actuates one or both of the pivotable or tiltable roll bodies such that the roll bodies are pivoted or tilted depending on the detected position information relating to the semi-finished fiber product as it passes through the shearing arrangement, so as to thus compensate for deviations in the path as the semi-finished fiber product is conveyed through the shearing arrangement. The position or the path of the semi-finished fiber product as it is conveyed through the shearing arrangement along the roll bodies can be changed on account of the pivoting or tilting of the roll bodies in the semi-finished fiber product plane, such that, by way of example, a constant distance of the roll bodies with respect to the edges of the semi-finished fiber product can be set at all times.

An active path regulation as a flat semi-finished fiber product is conveyed through a shearing device which shears the flat semi-finished fiber product by means of roll bodies bearing against said product in a frictionally engaged manner and by means of a rotational speed difference set between said roll bodies is thus made possible, such that a defined target shearing of the flat semi-finished fiber product can be provided in a reproducible manner.

The angle of engagement between the roll body and the fiber material changes on account of the pivoting or tilting of the roll bodies, and a force acting perpendicularly is thus introduced into the fiber material and conveys the fiber material in the tilt or pivot direction in which the roll body has been tilted or pivoted. The semi-finished fiber product can thus be conveyed on the whole in one or other of the directions lying transversely to the conveying direction so as to thus counteract and compensate for a deviation of the fiber material from the predefined conveying path.

Here, any rotatable bodies which can bear against the fiber material in a frictionally engaged manner and which can cause a shearing of the fibers on account of the rotational speed difference can be considered as a roll body. Here, the roll bodies can have any shapes, for example cylinder or cone shapes, which are suitable for bearing against the fiber material and producing a shearing effect.

Here, the roll bodies are tilted or pivoted within a semi-finished fiber product plane defined by the semi-finished fiber product. As the roll bodies are tilted or pivoted in the semi-finished fiber product plane, the distance of the axis of rotation of the roll body to the flat semi-finished fiber product advantageously remains unchanged, such that, even when tilted and pivoted, the roll body still remains in frictionally engaged contact over its entire roll width with the flat semi-finished fiber product. Merely the angle of engagement of the roll body changes with respect to the conveying direction, such that a force transverse to the conveying direction, in particular perpendicular thereto, is introduced into the semi-finished fiber product and can be changed by the path of the conveying direction.

The frictional engagement of the roll body with the fiber material can advantageously be produced by means of a pressing surface arranged opposite the roll body.

In accordance with an advantageous embodiment, for at least one of the roll bodies, an oppositely arranged roll body rotating in the opposite direction is arranged in the shearing arrangement in order to form a roll body pair. The two roll bodies of the roll body pair are formed here such that the semi-finished fiber product can be guided in the conveying direction between the two roll bodies of the roll body pair. Each of the two roll bodies thus bears in a frictionally engaged manner against a different side of the flat semi-finished fiber product. Due to the formation of a roll body pair, the frictional engagement between the roll bodies and the semi-finished fiber product is produced. The two roll bodies of the roll body pair rotating in opposite directions advantageously can be pivoted or tilted jointly, and the control arrangement can be designed for the parallel pivoting or tilting of the roll bodies depending on the detected position information relating to the semi-finished fiber product. As a result, the frictional engagement is maintained in order to convey and shear the semi-finished fiber product, even in the event of a path correction by means of pivoting or tilting of the semi-finished fiber products.

In accordance with an advantageous development of the invention, each of the roll bodies arranged at a distance from one another in the conveying direction has an oppositely arranged roll body rotating in an opposite direction so as to form respective roll body pairs, such that, for the defined shearing by means of roll bodies arranged at a distance from one another in the conveying direction, roll body pairs are arranged at a distance from one another in the conveying direction. Each of these roll body pairs is formed here such that it can be pivoted or tilted so that the control arrangement can pivot or tilt the roll bodies of the particular roll body pair in parallel.

If there are at least two roll body pairs provided in the shearing arrangement, a feed unit can also be formed at the same time by the roll body pairs and the respective roll bodies, which feed unit guides the flat semi-finished fiber product between the roll bodies or roll body pairs and thus conveys said product through the shearing arrangement.

In accordance with a further advantageous embodiment, the device is designed to produce a curved preform profile, for example a Z- or C-profile, with a defined curvature. For this purpose, the shearing arrangement of the device has at least three roll bodies, wherein at least two of the three roll bodies bear in a frictionally engaged manner against different flanges of the profile to be produced. These roll bodies bearing against different flanges are set here to the same rotational speed by the control arrangement. By contrast, a further roll body is distanced in the conveying direction from these two roll bodies, is arranged at one of the flanges, and is set by the control arrangement to a rotational speed different from that of the two other roll bodies, such that a rotational speed difference can be set at a flange between the roll bodies bearing against this flange and roll bodies arranged at a distance therefrom. This set rotational speed difference then leads to a shearing in the inner or outer projection or inner flange or outer flange of the preform profile and thus enables the production of a curved preform profile with defined shearing of the fiber material and thus continuously high quality.

Here, corresponding position information relating to the semi-finished fiber product flange of the preform profile is detected with the aid of the semi-finished fiber product detection device, such that one or more of the roll bodies bearing against the flanges can be tilted or pivoted so as to thus counteract and compensate for a deviation of the fiber material as this is conveyed through the shearing arrangement. Here, the roll bodies bearing against the flanges are tilted or pivoted in a flange plane, wherein the flange plane is produced by the relevant flange of the preform profile.

In accordance with an advantageous development, it is very particularly advantageous when, for each of the at least three roll bodies, there is provided an oppositely arranged roll body rotating in the opposite direction, which roll bodies together form a roll body pair in each case, such that at least two roll body pairs are arranged at one flange for shearing on account of the rotational speed difference set between the roll body pairs, and at the other flange there is arranged at least one roll body pairs so as to be able to convey the semi-finished fiber product profile through the shearing arrangement.

Here, the roll body pairs are formed such that the roll bodies of the particular roll body pair can be pivoted or tilted jointly, wherein the roll bodies are pivoted or tilted in the semi-finished fiber product flange plane defined by the semi-finished fiber product flange bearing against the roll bodies in a frictionally engaged manner. The roll bodies of a roll body pair are pivoted or tilted here in parallel, such that a semi-finished fiber product flange guided between the roll body pairs bears against the roll bodies in a frictionally engaged manner.

In accordance with a further advantageous embodiment the control arrangement is designed in such a way that it can vary the rotational speed of the roll bodies during the forming process in such a way that varying rotational speed differences can be set between the roll bodies arranged at a distance from one another during the entire forming process, such that the radius of curvature of the curvature of the preform to be produced can be varied. It is thus possible for preforms or preform profiles which have a varying radius of curvature to be produced.

In accordance with a further advantageous embodiment the semi-finished fiber product detection arrangement is designed to detect semi-finished fiber product edges of the semi-finished fiber product to be sheared, wherein it is possible to derive position information from the detected semi-finished fiber product edges. In particular, it is possible, on this basis, to derive information relating to the position of the semi-finished fiber product to be sheared with respect to the roll bodies, more specifically the position of the semi-finished fiber product edges with respect to the roll bodies provided for shearing. The control arrangement can then tilt or pivot the roll bodies accordingly on this basis so as to produce an appropriate path regulation.

The tilting of the roll bodies is understood to mean in particular a change in position in which the roll body is rotated about an axis extending perpendicularly to the axis of rotation of the roll body and in particular perpendicularly to the semi-finished fiber product. The axis of rotation extends in the region of the roll body during the tilting process.

During the pivoting process, the roll body is rotated about an axis extending perpendicularly to the axis of rotation of the roll body and in particular to the semi-finished fiber product, wherein the axis of rotation for the pivoting lies outside the roll body.

The invention will be explained in greater detail and by way of example on the basis of the accompanying drawings, in which.

Figure 1:
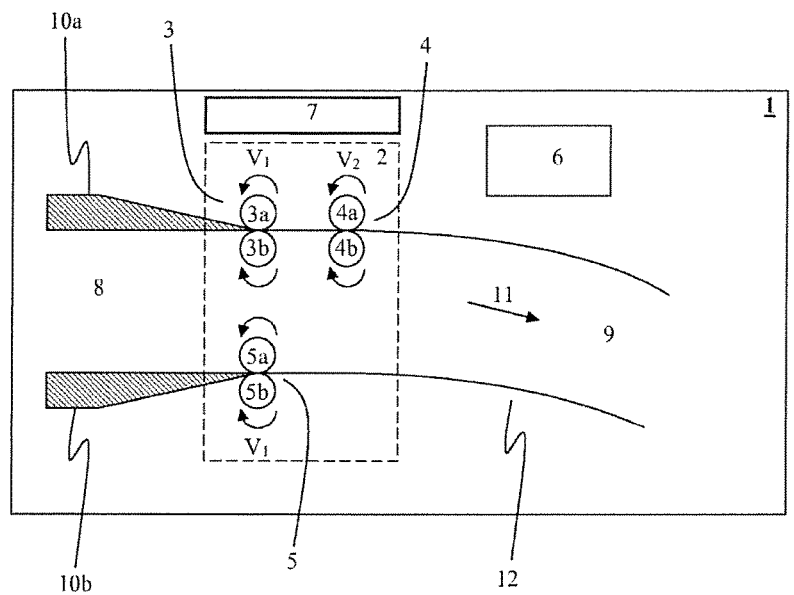
FIG. 1 shows a schematic illustration of the device according to the invention for producing a curved preform.

FIG. 1 shows a plan view of the device 1 in a schematically simplified manner. The device 1 has a shearing device 2, which has a total of three roll body pairs 3, 4 and 5. Here, the roll body pair 3 has two oppositely arranged roll bodies 3a and 3b, which rotate in opposite directions and between which a fiber material can be guided. In an identical manner, the roll body pairs 4 and 5 are formed so as to each have two roll bodies 4a, 4b and 5a, 5b respectively.

The roll bodies of the three roll body pairs 3, 4 and 5 are connected to a control arrangement 6, which actuates the individual roll bodies of the roll body pairs in such a way that their rotational speeds $V_1$, $V_2$ can be individually set. The physical connection is not shown in FIG. 1 for reasons of clarity.

Figure 2:
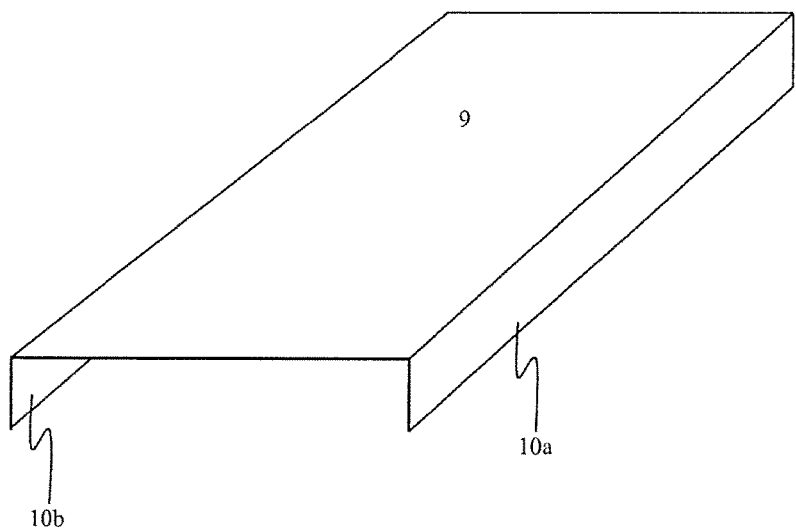
FIG. 2 shows a schematic illustration of a perspective illustration of a C-profile.

The device 1 is formed in the exemplary embodiment of FIG. 1 so as to produce a curved preform profile 9, which has a C-profile as illustrated in FIG. 2, from a flat semi-finished fiber product 8. For this purpose, the edges 10a, 10b of the flat semi-finished fiber product 8 are guided between the roll bodies of the respective roll body pairs so that the edges 10a, 10b of the semi-finished fiber product form the later flanges of the curved C-profile 9.

With this device 1, not only is the curvature of the preform profile provided, but at the same time the desired profile shape is also produced.

The roll body pairs 3 and 5 of the device 1 are arranged here in each case at opposite edges or flanges of the semi-finished fiber product and are actuated by the control arrangement 6 such that the roll bodies 3a and 3b and 5a, 5b each have the same rotational speed $V_1$. The roll body pair 3 is arranged here at the flange 10a of the preform profile 8, whereas the roll pair 5 is arranged at the opposite flange 10b of the preform profile 9.

The roll body pair 4 with the roll bodies 4a and 4b is by contrast arranged such that it is provided at the flange 10a at which the roll body pair 3 is arranged, at a distance from the roll body pair 3 in the conveying direction 10 or rolling direction. The roll body pairs 3 and 4 thus act on the same flange 10a of the preform profile 9. The rotational speed of the roll bodies 4a, 4b of the roll body pair 4 is different here from the rotational speed $V_1$ of the roll body pairs 3 and 5. This thus provides a rotational speed difference $V_2-V_1$, which leads to a fiber shearing of the semi-finished fiber product 8 and thus leads to a desired curvature 12 of the preform profile 9.

By varying the rotational speed difference $V_2-V_1$, the radius of curvature of the curvature 12 can be set accordingly, wherein the control arrangement 6 is designed in such a way that it can set the rotational speed difference $V_2-V_1$ during the forming process, i.e. as the semi-finished fiber product 8 is conveyed through the shearing arrangement 2, such that a profile having different radii of curvature is produced.

Furthermore, the device 1 has a semi-finished fiber product detection device 7 which detects position information relating to the semi-finished fiber product 8, in particular position information relating to the semi-finished fiber product flanges 10a and 10b. The position information is now provided to the control arrangement 6 so that the control arrangement 6 can actuate the roll bodies of the roll body pairs 3, 4 and in order to tilt or pivot the roll bodies accordingly. A deviation of the semi-finished fiber product from the predefined target path is to be counteracted as a result. If more than 3 roll body pairs are provided, all can thus also be tiltable or pivotable.

FIG. 2 shows a finished produced preform profile 9 which has formed flanges 10a, 10b on the left and right. Due to the engagement of the roll bodies of the device with the flanges 10a, 10b in the above-described manner and due to the setting of a speed difference between the roll bodies arranged at a distance from one another, a fiber shearing can be provided, which ultimately leads to a curvature of the profile 9.

Figure 3:
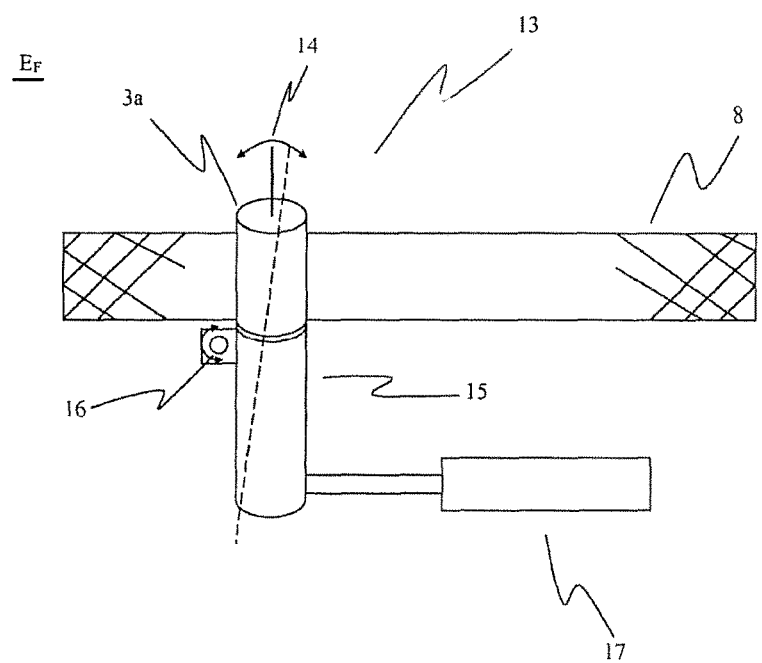
FIG. 3 shows a schematic illustration of a pivotable roll arrangement with roll bodies.

FIG. 3 shows schematically a roll arrangement 13 which has a roll body 3a which rotates about an axis of rotation 14. The roll body 3a can rotate about the axis of rotation 14 via a drive unit 15 of the roll arrangement 13.

Part of the semi-finished fiber product 8 now bears in a frictionally engaged manner against the roll body 3a of the roll arrangement 13 so as to provide the previously described shearing of the semi-finished fiber product 8.

In addition, the roll arrangement 13 is arranged on the device 1 such that it can be pivoted in the semi-finished fiber product plane $E_f$ in a manner pivotable about a pivot axis 16. For this purpose, the roll arrangement 13 has a linear actuator 17, with which the roll arrangement can be pivoted about the pivot axis 16. Due to the pivoting of the roll arrangement 13 about the pivot axis 16, the angle of engagement of the roll body 3a with respect to the semi-finished fiber product 8 is changed, such that a force acts transversely to the conveying direction 11. The conveying direction can thus be corrected, such that for example the semi-finished fiber product 8 in the exemplary embodiment of FIG. 3 is conveyed at the upper or lower edge of FIG. 3. By pivoting the roll body 3a in the semi-finished fiber product plane $E_f$, a path regulation is thus achieved with respect to the conveying direction 11, such that a target path is set in an optimal manner at all times.

LIST OF REFERENCE SIGNS

1 device
2 shearing arrangement
3 first roll body pair
3a, 3b roll bodies of the first roll body pair
4 second roll body pair
4a, 4b roll bodies of the second roll body pair 4
5 third roll body pair
5a, 5b roll bodies of the third roll body pair 5
6 control arrangement
7 semi-finished fiber product detection device
8 semi-finished fiber product
9 preform profile
10a, 10b flange of the preform profile
11 conveying direction
12 profile curvature
13 roll arrangement
14 axis of rotation of a roll body
15 drive unit
16 pivot axis
17 linear actuator
$E_f$ semi-finished fiber product plane

The invention claimed is:

1. A device for producing a curved preform from flat semi-finished fiber products, comprising:
   a shearing arrangement which has at least two rotating roll bodies arranged at a distance from one another in a conveying direction;
   a control arrangement connected to the at least two rotating roll bodies,
   wherein the control arrangement is configured to set rotational speeds ($V_1$, $V_2$) of the at least two rotating roll bodies, wherein said set rotational speeds are different from one another,
   wherein said at least two rotating roll bodies are formed so as to bear in a frictionally engaged manner against a semi-finished fiber product introduced into the device and to cooperate with the semi-finished fiber product in such a way that a shearing of fibers of the semi-finished fiber product results from a rotational speed difference ($V_1-V_2$) set by the control arrangement between the at least two roll bodies arranged at a distance from one another in the conveying direction to form a curved preform from the semi-finished fiber product
   wherein at least one of the at least two rotating roll bodies is pivotable or tiltable; and
   a semi-finished fiber product detection arrangement which detects position information relating to the semi-finished fiber product conveyed through the shearing arrangement,
   wherein the control arrangement controls pivoting or tilting of the at least one roll body as the semi-finished fiber product is conveyed dependent on detected position information of the semi-finished product detection arrangement.

2. The device as claimed in claim 1, wherein the at least one roll body is pivotable or tiltable in a semi-finished fiber product plane ($E_F$) defined by the semi-finished fiber product bearing against the at least one roll body in a frictionally engaged manner.

3. The device as claimed in claim 1, wherein the at least two rotating roll bodies include a roll body pair which includes roll bodies rotating in opposite directions, wherein the flat semi-finished fiber product is conveyed between the roll bodies rotating in opposite directions of the roll body pair, and wherein the roll bodies rotating in opposite directions of the roll body pair are pivotable or tiltable jointly, and wherein the control arrangement is configured to pivot or tilt the roll bodies of the roll body pair in parallel depending on the detected position information of the semi-finished fiber product detection arrangement.

4. The device as claimed in claim 1 wherein the at least two rotating roll bodies arranged at a distance from one another in the conveying direction include a plurality of roll body pairs where each roll body in each roll body pair rotates in an opposite direction from another roll body in each roll body pair.

5. The device according to claim 1 wherein the shearing arrangement has at least three roll bodies, of which at least two roll bodies bear against different flanges of a preform profile to be produced and a third roll body bears against one of the flanges in a manner arranged at a distance in the conveying direction from a roll body of the at least two roll bodies which bears against the one of the flanges, and wherein the control arrangement is configured to set a same rotational speed at the at least two roll bodies bearing against the different flanges of the preform profile and to set a different rotational speed at the third roll body so as to produce shearing of the fibers as a result of the rotational speed difference of the roll bodies bearing against the one of the flanges, wherein at least the two roll bodies bearing against different flanges of the preform profile are pivotable or tiltable, wherein the semi-finished fiber product detection arrangement is formed so as to detect position information relating to the flanges of the preform profile and the control arrangement is configured to pivot or tilt the least two roll bodies depending on position information relating to the flanges.

6. The device as claimed in claim 5, wherein for each of the at least three roll bodies, an oppositely arranged roll body rotating in an opposite direction is arranged to form a roll body pair, wherein the flange of the preform profile to be produced is conveyed between the roll body pair, wherein roll bodies rotating in opposite directions of the roll body pair are pivotable or tiltable jointly, and wherein the control arrangement is configured to pivot or tilt the roll bodies of the roll body pair in parallel depending on the detected position information of the semi-finished fiber product detection arrangement.

7. The device as claimed in claim 1 wherein the control arrangement is configured to vary the rotational speed of the at least two rotating roll bodies during a forming process in such a way that a radius of curvature of the preform is varied.

8. The device as claimed in claim 1 wherein the semi-finished fiber product detection device detects semi-finished fiber product edges of the semi-finished fiber product to be sheared and detects position information depending on the detected semi-finished fiber product edges.

9. A method for producing a curved preform from a flat semi-finished fiber product, comprising:
   a) introducing a flat semi-finished fiber product into a shearing arrangement which has at least two rotating roll bodies arranged at a distance from one another in a conveying direction wherein the at least two rotating roll bodies are controlled by a control arrangement connected to the at least two rotating roll bodies, and wherein the semi-finished fiber product introduced into the shearing arrangement bears in a fictionally engaged manner against the at least two rotating roll bodies,
   b) setting a rotational speed for each roll body of the at least two rotating roll bodies in such a way that a shearing of fibers of the semi-finished fiber product is produced by a rotational speed difference, wherein setting is performed with the control arrangement so as to form the curvature of the preform to be produced,
   c) detecting position information relating to the semi-finished fiber product conveyed through the shearing arrangement by a semi-finished fiber product detection arrangement, and
   d) pivoting or tilting at least one of the at least two rotating roll bodies under the control of the control arrangement as the semi-finished fiber product is conveyed, depending on detected position information relating to the semi-finished fiber product.

10. The method as claimed in claim 9, wherein the introducing step is performed in such a way that the semi-finished fiber product is guided between roll bodies rotating in opposite directions which form a roll body pair, wherein the roll bodies of a roll body pair are pivoted or tilted in parallel in a semi-finished fiber product plane by actuation of the roll bodies in the roll body pair by the control arrangement depending on the detected position information relating to the semi-finished fiber product.

11. The method as claimed in claim 9 wherein the introducing step is performed in such a way that the semi-finished fiber product bears against at least two roll bodies, in each case via different flanges of a preform profile to be produced from the semi-finished fiber product, and at least one further roll body bears against a flange of the different flanges at a distance in the conveying direction from one of the at least two roll bodies bearing against the flange, wherein rotational speeds of the further roll body and the at least two roll bodies are set by the control arrangement in such a way that a same rotational speed is provided at the at least two roll bodies bearing against different flanges and a different rotational speed is provided at the further roll body arranged at the same flange which the one of the least two roll bodies bears against, wherein position information relating to the flanges of the preform profile is detected by the semi-finished fiber product detection arrangement and, based on this information, the roll bodies are pivoted or tilted in the semi-finished fiber product flange plane defined by the semi-finished fiber product flange bearing against the roll bodies in a frictionally engaged manner.

12. The method as claimed in claim 9 wherein a rotational speed of the at least two rotating roll bodies is varied during a forming process to vary a radius of curvature of the preform produced.

13. The method as claimed in claim 9 wherein semi-finished fiber product edges of the semi-finished fiber product to be sheared are detected by the semi-finished product detection arrangement and position information is detected by the semi-finished product detection arrangement depending on detected semi-finished fiber product edges.

* * * * *